United States Patent
Damnjanovic et al.

(10) Patent No.: US 9,819,467 B2
(45) Date of Patent: Nov. 14, 2017

(54) COMMUNICATING FEEDBACK IN LISTEN-BEFORE-TALK (LBT) WIRELESS NETWORKS

(71) Applicant: QUALCOMM Incorporated, San Diego, CA (US)

(72) Inventors: Aleksandar Damnjanovic, Del Mar, CA (US); Wanshi Chen, San Diego, CA (US); Madhavan Srinivasan Vajapeyam, San Diego, CA (US); Durga Prasad Malladi, San Diego, CA (US); Yongbin Wei, San Diego, CA (US); Tao Luo, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 155 days.

(21) Appl. No.: 14/819,191

(22) Filed: Aug. 5, 2015

(65) Prior Publication Data

US 2016/0043854 A1    Feb. 11, 2016

Related U.S. Application Data

(60) Provisional application No. 62/035,324, filed on Aug. 8, 2014.

(51) Int. Cl.
*H04L 5/00* (2006.01)
*H04L 1/18* (2006.01)
*H04L 1/16* (2006.01)

(52) U.S. Cl.
CPC .......... *H04L 5/0055* (2013.01); *H04L 1/1614* (2013.01); *H04L 1/1685* (2013.01); *H04L 1/1854* (2013.01); *H04L 1/1867* (2013.01); *H04L 1/1896* (2013.01); *H04L 5/0048* (2013.01)

(58) Field of Classification Search
CPC ... H04L 5/0055; H04L 1/1867; H04L 5/0048; H04L 1/1614; H04L 1/1685; H04L 1/1896; H04L 1/1854
See application file for complete search history.

(56) References Cited

U.S. PATENT DOCUMENTS

| 8,472,365 B2 * | 6/2013 | Liu ...................... H04L 1/1664 370/312 |
| 2010/0260130 A1 * | 10/2010 | Earnshaw ............. H04L 1/1812 370/329 |

(Continued)

OTHER PUBLICATIONS

International Search Report and Written Opinion—PCT/US2015/043998—ISA/EPO—Oct. 22, 2015 (9 total pages).

*Primary Examiner* — Ajay Cattungal
(74) *Attorney, Agent, or Firm* — Arent Fox, LLP

(57) ABSTRACT

Aspects described herein relate to communicating feedback in a wireless network. An indication to communicate feedback for a plurality of subframes to an access network node can be received from the access network node. A plurality of process identifiers related to transport blocks received in the plurality of subframes can be determined. Feedback for the plurality of process identifiers received in the plurality of subframes can be grouped, and the grouped feedback and/or a feedback tag indicative of the plurality of subframes can be transmitted to the access network node.

30 Claims, 8 Drawing Sheets

(56) References Cited

U.S. PATENT DOCUMENTS

| | | | | |
|---|---|---|---|---|
| 2010/0275083 A1* | 10/2010 | Nam | ................. | H03M 13/6306 |
| | | | | 714/748 |
| 2011/0269490 A1* | 11/2011 | Earnshaw | ............. | H04L 1/0026 |
| | | | | 455/509 |
| 2013/0021932 A1* | 1/2013 | Damnjanovic | ... | H04W 52/0229 |
| | | | | 370/252 |
| 2013/0163444 A1* | 6/2013 | Tee | ......................... | H04L 69/40 |
| | | | | 370/252 |
| 2015/0071191 A1* | 3/2015 | Kim | ..................... | H04L 5/0073 |
| | | | | 370/329 |
| 2015/0264704 A1* | 9/2015 | Park | .................. | H04W 72/1231 |
| | | | | 370/329 |
| 2015/0288505 A1* | 10/2015 | Park | ..................... | H04L 5/0073 |
| | | | | 370/336 |
| 2015/0327287 A1* | 11/2015 | Kim | ................... | H04W 72/121 |
| | | | | 370/329 |
| 2016/0135194 A1* | 5/2016 | Kim | ..................... | H04L 1/0038 |
| | | | | 370/329 |

* cited by examiner

COMMUNICATING FEEDBACK IN LISTEN-BEFORE-TALK (LBT) WIRELESS NETWORKS

CLAIM OF PRIORITY UNDER 35 U.S.C. §119

The present Application for Patent claims priority to Provisional Application No. 62/035,324 entitled "COMMUNICATING FEEDBACK IN LISTEN-BEFORE-TALK (LBT) WIRELESS NETWORKS" filed Aug. 8, 2014, which is assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

User equipment (UE) employ these technologies to communicate with evolved Node Bs (eNB) to access core network components and functionalities. In one example, UEs can communicate to eNBs using LTE in an unlicensed or shared frequency spectrum (LTE-U). In some cases, the utilized spectrum may include frequencies used in other types of networks, such as wireless local area networks (WLAN) employing Institute of Electrical and Electronics Engineers (IEEE) 802.11 (Wi-Fi). These networks can implement listen-before-talk (LBT) mechanisms where devices perform a clear channel assessment (CCA) to acquire or gain access to a channel and can communicate over the acquired channel without requiring scheduling of resources. Where LTE is employed over these networks, transmitting hybrid automatic repeat/request (HARQ) feedback may not comply with current LTE standards based on scheduled grants as a UE may not be able to acquire a channel (e.g., perform a successful CCA) at the time when the feedback is due according to the LTE standards. In addition, executing the CCA for transmitting each feedback transmission may be burdensome to network resources and may cause additional delay in transmitting the feedback.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of communicating feedback in a wireless network is provided. The method includes receiving, from an access network node, an indication to communicate feedback for a plurality of subframes to the access network node, determining a plurality of process identifiers related to transport blocks received in the plurality of subframes, grouping feedback for the plurality of process identifiers received in the plurality of subframes, and transmitting the grouped feedback and a feedback tag indicative of the plurality of subframes to the access network node.

In another example, an apparatus for communicating feedback in a wireless network is provided. The apparatus includes a feedback trigger receiving component configured to receive, from an access network node, an indication to communicate feedback for a plurality of subframes to the access network node, a process identifier determining component configured to determine a plurality of process identifiers related to transport blocks received in the plurality of subframes, a feedback grouping component configured to group feedback for the plurality of process identifiers received in the plurality of subframes, and a feedback transmitting component configured to transmit the grouped feedback and a feedback tag indicative of the plurality of subframes to the access network node.

In yet another example, an apparatus for communicating feedback in a wireless network is provided. The apparatus includes means for receiving, from an access network node, an indication to communicate feedback for a plurality of subframes to the access network node, means for determining a plurality of process identifiers related to transport blocks received in the plurality of subframes, means for grouping feedback for the plurality of process identifiers received in the plurality of subframes, and means for transmitting the grouped feedback and a feedback tag indicative of the plurality of subframes to the access network node.

In another example, a computer-readable medium comprising computer-executable code for communicating feedback in a wireless network is provided. The code includes code for receiving, from an access network node, an indication to communicate feedback for a plurality of subframes to the access network node, code for determining a plurality of process identifiers related to transport blocks received in the plurality of subframes, code for grouping feedback for the plurality of process identifiers received in the plurality of subframes, and code for transmitting the grouped feedback and a feedback tag indicative of the plurality of subframes to the access network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
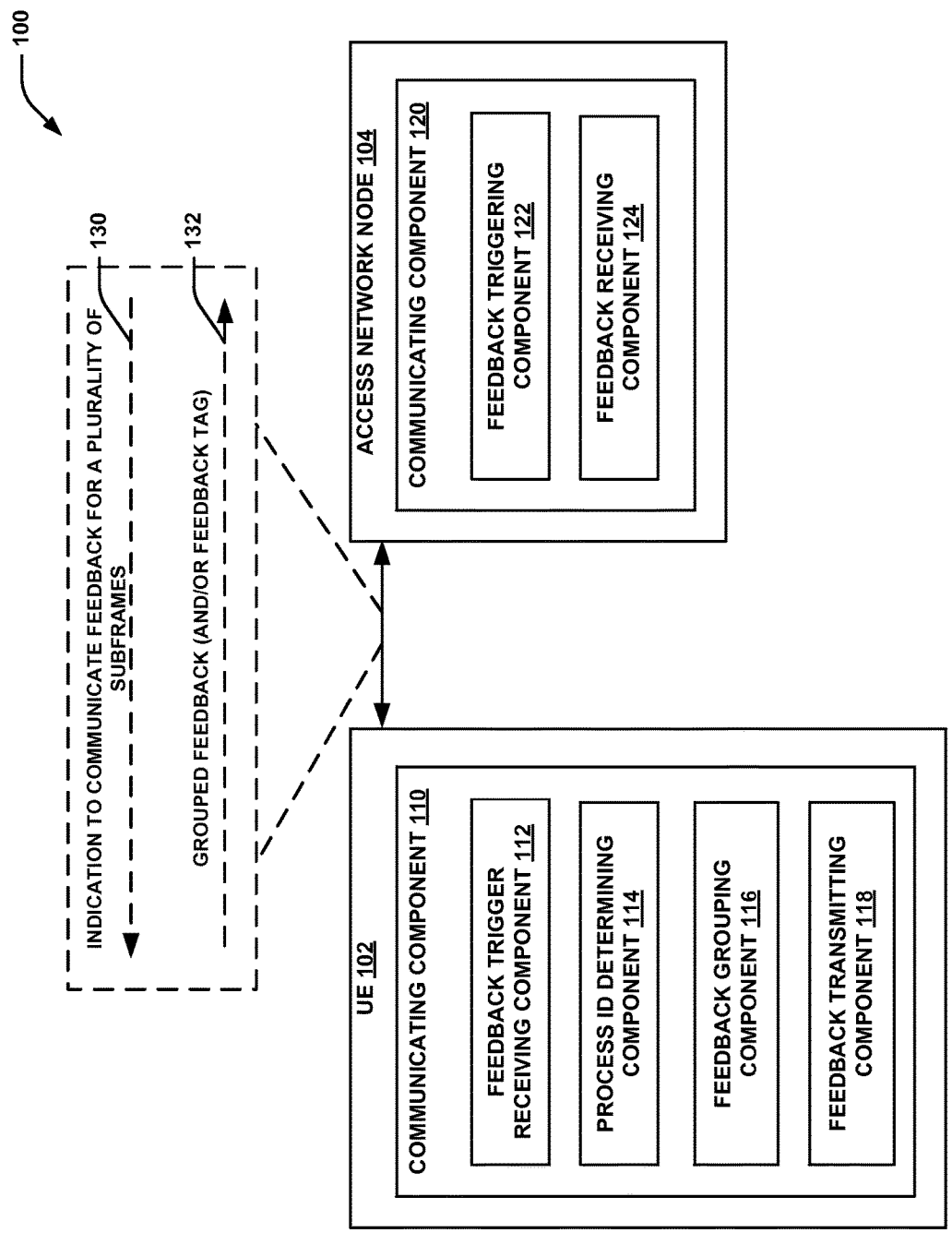
FIG. 1 is a block diagram illustrating an example wireless communications system according to aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are aspects related to communicating feedback in listen-before-talk (LBT) wireless networks (e.g., wireless local area networks (WLAN)) that employ wireless communication technologies that utilize scheduled resources (e.g., wireless wide area network (WWAN) technologies). For example, this can include LTE in an unlicensed band (LTE-U) networks. For convenience, LTE on an unlicensed or shared radio frequency (RF) band may be referred to herein as LTE/LTE Advanced in unlicensed spectrum, LTE-U, or simply LTE in the surrounding context. LTE on an unlicensed band may involve a UE or some other device that is configured to access a network operating in a contention-based RF band or spectrum. In an example, in LBT wireless networks, UEs may perform clear channel assessments (CCA) (and/or extended CCA (ECCA) when CCA fails) over a frequency band to check an energy level over the band in determining whether to transmit communications in a given frame or whether the frequency band is occupied. In this example, because the CCA and/or ECCA may take some time or fail, feedback requirements of LTE may not be reliably attained when LBT wireless networks are utilized. Thus, aspects described herein relate to facilitating asynchronous communication of feedback for LTE in LBT wireless networks, or in other networks that utilize CCA/ECCA or a similar LBT mechanism to acquire channel resources.

In an example, an evolved Node B (eNB) in the LBT wireless network can trigger communication of feedback to the UE, such that the UE can access a channel (e.g., using CCA) and transmit the feedback to the eNB. In addition, resources for uplink feedback are granted by the eNB to the UE, and may indicate a plurality of subframes and/or the related hybrid automatic repeat/request (HARQ) process identifiers for which feedback (e.g., acknowledgement (ACK)/negative-acknowledgement (NACK) of data received from the eNB) is to be transmitted by the UE to the eNB. In one example, the eNB may include a feedback tag in the resource grant, in another trigger sent to the UE to cause transmission of feedback, etc. A feedback tag can relate to substantially any identifier for indicating a set of subframes for which feedback is to be transmitted by the UE. For example, the feedback tag can correspond to a number that is configured between the UE and eNB as relating to one or more HARQ process identifiers, as described herein. In any case, the UE can transmit feedback for one or more HARQ processes relating to one or more subframes using a HARQ process identifier bitmap, bundled feedback, and/or the like. In addition, the UE may include the feedback tag, where specified to the UE, to allow the eNB to verify that expected feedback is received. Moreover, the resource grant for the uplink feedback may allow for transmitting feedback using a control channel and a related format, a shared data channel, etc.

Figure 2:
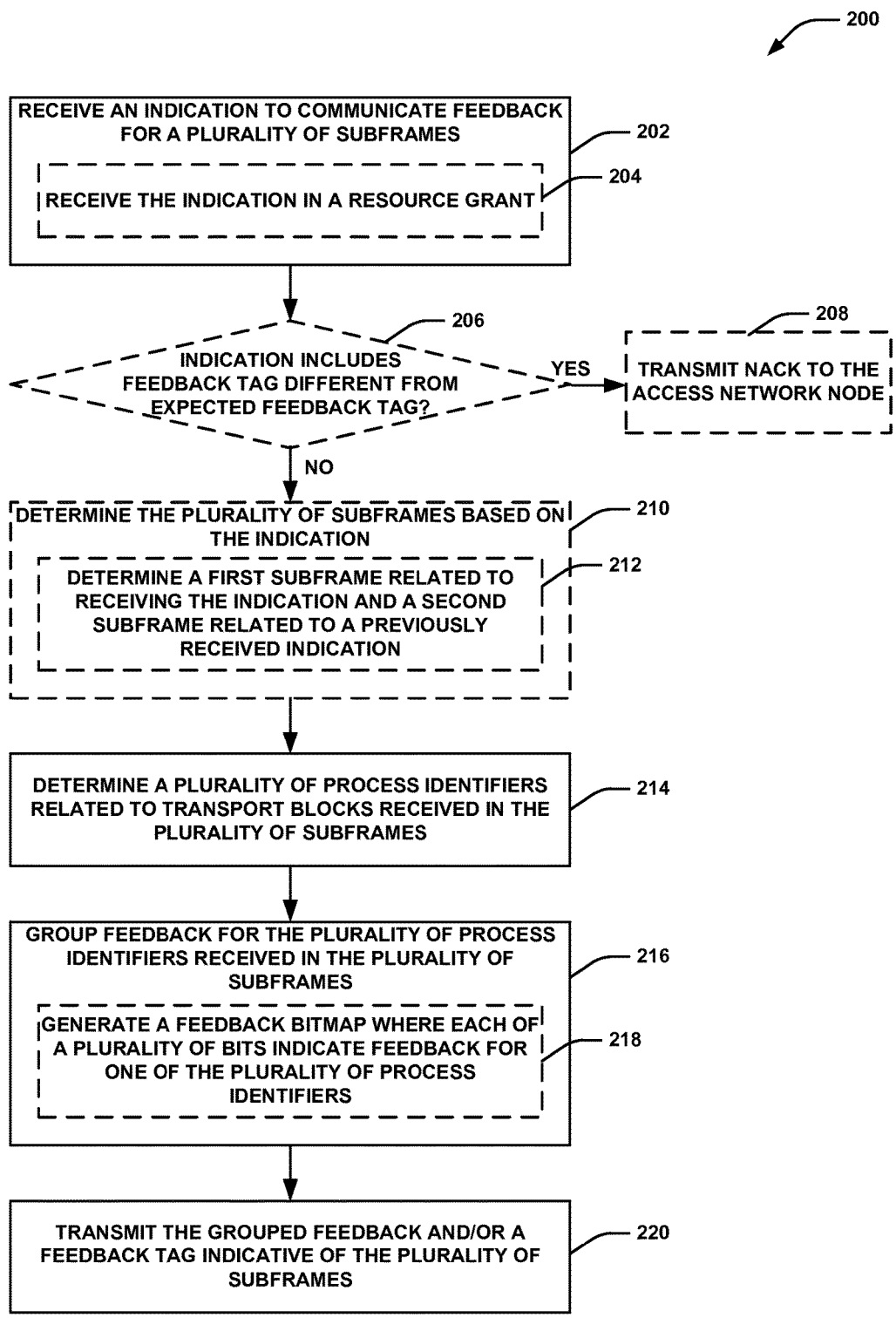
FIG. 2 is a flow diagram comprising a plurality of functional blocks representing an example methodology for transmitting grouped feedback in accordance with aspects described herein.
Figure 3:
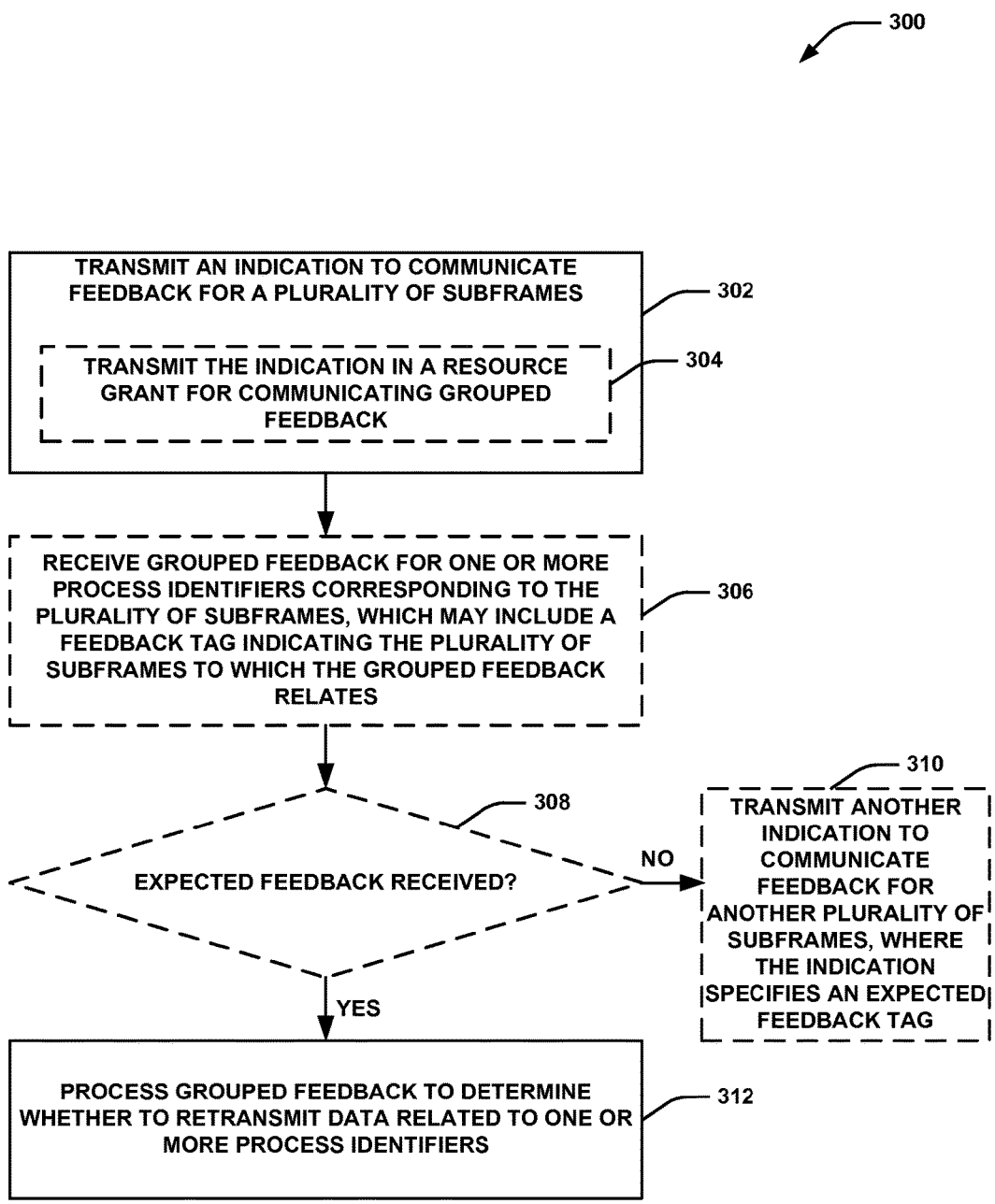
FIG. 3 is a flow diagram comprising a plurality of functional blocks representing an example methodology for receiving grouped feedback in accordance with aspects described herein.

Referring to FIGS. 1-3, aspects are depicted with reference to one or more components and one or more methods that may perform the actions or functions described herein. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. FIG. 1 includes a UE 102 that communicates with an access network node 104 to receive access to a wireless network. In one example, the wireless network can be a WWAN network, such as LTE, accessible via resources of a LBT network, such as Wi-Fi (e.g., in LTE-U). In this regard, UE 102 may perform a CCA and/or ECCA in accessing network resources for communicating with access network node 104. In addition, though shown and described as a single UE 102 accessing a single access network node 104, it is to be appreciated that multiple UEs can communicate with access network node 104, a UE 102 can communicate with multiple access network nodes, etc.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), wearable device (e.g. smart watch, smart glasses, smart wristband), and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air (OTA) communication link using one or more OTA communication protocols described herein. Additionally, in some examples, UE 102 may be configured to facilitate communication on multiple separate networks via multiple separate subscriptions, multiple radio links, and/or the like.

Furthermore, access network node 104 may comprise one or more of any type of network module, such as an access point, a macro cell, including a base station (BS), node B, eNodeB (eNB), a relay, a peer-to-peer device, a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, access network node 104 may communicate with one or more other network entities of wireless and/or core networks. Access network node 104 may include an eNodeB or other components of an E-UTRAN, as described further herein, a WLAN node, such as a Wi-Fi hotspot that supports wireless communications with a network via WiFi radio access, etc.

For example, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UE 102, access network node 104) may be coupled to a core network via one or more wired or wireless connections.

In an example, UE 102 and access network node 104 communicate in a network where UE 102 performs CCA and/or ECCA to acquire channel resources to communicate with access network node 104. Thus, it may be difficult to conform to certain scheduling requirements of an underlying network technology supported by the access network node 104 and/or UE 102 based on the UE 102 acquiring resources at unknown times. For example, for communicating feedback, the UE 102 may transmit feedback to the access network node 104 for communications received therefrom the next time the UE 102 is able to acquire a channel, which may not occur according to a schedule defined for the feedback (e.g., 4 ms following the communications from the access network node 104 in LTE). In addition, acquiring the channel for reporting feedback for each communication received from access network node 104 may result in significant load on the network caused by constantly acquiring the channel.

In this regard, where access network node 104 expects to receive feedback regarding communication resources from UE 102, it may be desirable to group individual feedback for multiple subframes and/or for multiple process identifiers in a single grouped feedback communication that may include the feedback for each of the multiple subframes or a single bundled feedback for the multiple subframes (e.g., a NACK for the multiple subframes where feedback for at least one of the subframes is NACK). Thus, this feedback can be communicated asynchronously to communications received over the resources for which the feedback is reported. This approach can conserve network resources due to reducing the number of feedback transmissions. In addition, this asynchronous approach can mitigate scheduling and timing requirements previously specified for certain WWAN technologies (e.g., LTE), as such requirements may be difficult to achieve given the CCA/ECCA processes to acquire channel resources for transmission. For example, scheduling cannot be guaranteed as the CCA/ECCA may or may not complete successfully or may not complete by an expected time.

Thus, access network node 104 can trigger grouped feedback communications from UE 102. In this regard, access network node 104 may use grouping information (e.g., a feedback tag) to facilitate identifying a plurality of subframes for which a grouped feedback report is being triggered. Thus, UE 102 includes a communicating component 110, which can include or can be in communication with, a feedback trigger receiving component 112 for receiving a feedback trigger from the access network node 104, a process identifier (ID) determining component 114 for determining a plurality of process identifiers received in a plurality of subframes, a feedback grouping component 116 for grouping feedback for each of the plurality of process identifiers (e.g., in the plurality of subframes), and a feedback transmitting component 118 for transmitting the grouped feedback to the access network node 104. Access network node 104 includes a communicating component 120, which can include or can be in communication with, a feedback triggering component 122 for triggering reporting of grouped feedback for a plurality of subframes from the UE 102, and a feedback receiving component 124 for receiving the grouped feedback from the UE 102.

In addition, the components and functions represented by FIG. 1, as well as other components and functions described herein, may be implemented using any suitable means. Such means also may be implemented, at least in part, using corresponding structure as taught herein. For example, the components described above in conjunction with the components of FIG. 1 also may correspond to similarly designated "means for" functionality. Thus, in some aspects one or more of such means may be implemented using one or more of processor components, integrated circuits, or other suitable structure as taught herein.

FIG. 2 illustrates an example method 200 for communicating grouped feedback in a wireless network. Method 200 includes, at Block 202, receiving an indication to communicate feedback for a plurality of subframes. Feedback trigger receiving component 112 can receive the indication to communicate feedback for the plurality of subframes 130. For example, feedback trigger receiving component 112 can receive the indication 130 from access network node 104, which may include a request received by the feedback trigger receiving component 112 from access network node 104 over the wireless network. In one example, receiving the indication at Block 202 may optionally include, at Block 204, receiving the indication in a resource grant. Thus, for example, feedback trigger receiving component 112 can receive the indication in a downlink resource grant for the feedback, over resources to which the downlink resource grant relates from access network node 104, and/or the like.

Moreover, for example, the indication may include an assignment of resources for communicating the feedback, which may be indicated implicitly or explicitly in the resource grant or other request from the access network node 104. Assignment of the resources for feedback may be implicitly indicated and determined based at least in part on selected modulation and coding scheme (MCS) for the assigned resources, a number of bits that are to be transmitted as HARQ feedback over the assigned resources, and/or the like. For example, communicating component 110 may receive a configuration specifying a mapping of resources (e.g., an amount of resources granted to the UE 102 for communicating feedback) to different MCSs, and feedback transmitting component 118 can determine the amount of resources based at least in part on the MCS and the mapping in this regard. In another example, feedback transmitting component 118 may determine the amount of resources as that sufficient to communicate feedback for indicated process identifiers, as described further herein. In any case, as described further herein, feedback transmitting component 118 may attempt to use the assigned resources for communicating grouped feedback, and/or may fallback to using other resources for transmitting the feedback where the CCA/ECCA for the assigned resources does not succeed (e.g., using resources after a next successful CCA/ECCA) according to the determined amount of resources or otherwise.

In addition, for example, the indication may include a feedback tag or other grouping information, from which the plurality of subframes for which to report feedback may be determined. A feedback tag, as described, can relate to substantially any identifier for indicating a set of subframes for which feedback is to be transmitted by the UE. In one example, the feedback tag may include a tag that is incremented each time grouped feedback is requested by the access network node 104 and/or transmitted by UE 102. Thus, in an example, the feedback tag can indicate a feedback tag of feedback that was last received from the UE 102 or a feedback tag of feedback to be received by the UE 102 (e.g., the last feedback tag plus 1). In either case, the feedback tag can be used to ensure the UE 102 and access network node 104 are synchronized with respect to the feedback being communicated, as described further herein. For example, the feedback tag can be an implicit acknowledgement that the access network node 104 received the last grouped feedback from the UE 102 (e.g., where the feedback tag has a value expected by the UE 102, whether the last received value or a current incremented value is used).

Method 200 optionally includes, at Block 206, determining whether the indication includes a feedback tag that is different from an expected feedback tag. For example, feedback trigger receiving component 112 can determine whether the indication includes a feedback tag that is different from the expected feedback tag. If so, method 200 also optionally includes, at Block 208, transmitting NACK to the access network node. Feedback transmitting component 118 can transmit the NACK to the access network node 104 in this case. For example, feedback trigger receiving component 112 may expect to receive a feedback tag that is either a previously received feedback tag (e.g., n−1, where n is an integer) or a current feedback tag (e.g., n). If a different feedback tag is received, feedback transmitting component 118 can transmit NACK as feedback for the communication from the access network node 104, for example. If the expected feedback tag is included in the indication, the method can optionally proceed to Block 210.

Method 200 optionally includes, at Block 210, determining the plurality of subframes based on the indication. Process ID determining component 114 can determine the plurality of subframes based on the indication. In an example, this can optionally include, at Block 212, determining a first subframe related to receiving the indication and a second subframe related to a previously received indication. Process ID determining component 114 may determine the first subframe related to receiving the indication and the second subframe related to the previously received indication. For example, process ID determining component 114 may determine the plurality of subframes based at least in part on determining a number of subframes between the previously received indication (e.g., of a previous feedback trigger from the access network node 104 and/or of a previous feedback transmission to the access network node 104) and a current subframe related to feedback trigger receiving component 112 receiving the indication. In other examples, the indication received by feedback trigger receiving component 112 may indicate the number of subframe, a range of subframes, etc. for which feedback reporting is requested.

In one specific example, process ID determining component 114 can initially determine to report grouped feedback for process identifiers in an initial subframe, 1 (e.g., subframe 0), and up to a second subframe, m, when a first indication is received by feedback trigger receiving component 112. For example, the second subframe may be the current subframe or some other subframe occurring before the current subframe by an offset number of subframes or other measure of time (e.g., current subframe minus 4 subframes), which may comply with LTE or other wireless communication standards. Thereafter, for example, if grouped feedback was provided for subframes l to m (e.g., for feedback tag n), then upon receiving the indication, process ID determining component 114 can determine process identifiers in subframes m+1 to a current subframe (or an offset from the current subframe) for which to report grouped feedback (e.g., for feedback tag n+1), where l, m, and n are integers, and l<m.

Moreover, where feedback trigger receiving component 112 receives a feedback tag of a previous reported grouped feedback, this can indicate that the access network node 104 did not receive the previous reported grouped feedback. Accordingly, process ID determining component 114 can determine to provide feedback for process identifiers in the subframe corresponding to the previous feedback tag (e.g., subframe m above) to the current subframe (or an offset from the current subframe) for which to report grouped feedback (e.g., for the previous feedback tag, n−1, plus 1, which is n).

Method 200 also includes, at Block 214, determining a plurality of process identifiers related to transport blocks received in the plurality of subframes. Process ID determining component 114 can determine the plurality of process identifiers related to transport blocks received in the plurality of subframes. For example, the process identifiers can relate to HARQ process identifiers or process identifiers related to other asynchronous feedback mechanisms. For example, the process identifier can be indicated by the access network node 104 in transmitting communications to the UE 102, and the UE 102 may utilize the process identifier to indicate feedback for the related communications to allow the access network node 104 to process the feedback as relating to the communications corresponding to the process identifier. For example, process ID determining component 114 can determine process identifiers received from the access network node 104 in the plurality of subframes (e.g., as determined in Block 204). In another example, the indication received by feedback trigger receiving component 112 may specify the process identifiers in the plurality of subframes for which feedback is desired by the access network node 104. It is to be appreciated that each process identifier may relate to one or more communications (e.g. a transport block) between the UE 102 and access network node 104 in one or more subframes.

Method 200 further includes, at Block 216, grouping feedback for the plurality of process identifiers received in the plurality of subframes. Feedback grouping component 116 can group feedback for the plurality of process identifiers received in the plurality of subframes. In one example, grouping the feedback at Block 216 can optionally include, at Block 218, generating a feedback bitmap where each of a plurality of bits indicates feedback for one of the plurality of process identifiers. Feedback grouping component 116 can generate the feedback bitmap where each of a plurality of bits indicate feedback for one of the plurality of process identifiers. It is to be appreciated that feedback grouping component 116 can generate substantially any collection of bits where one or more of the bits indicate feedback for the plurality of process identifiers (e.g., the bits can include at least one bit for each process identifier received in the plurality of subframes). In another example, grouping the feedback can include bundling feedback for the plurality of process identifiers received in the plurality of subframes as one or more feedback values (e.g., one or more bits). As described, the feedback indicated in the bits or bundled feedback can relate to HARQ feedback (e.g., ACK/NACK) for communications received from the access network node 104.

Method 200 also includes, at Block 220, transmitting the grouped feedback and/or a feedback tag indicative of the plurality of subframes. Feedback transmitting component 118 can transmit the grouped feedback and/or the feedback tag 132 indicative of the plurality of subframes (e.g., to the access network node 104). In one example, the feedback tag can be a value incremented with each grouped feedback transmission, as described. The feedback tag may be the feedback tag determined from the indication (e.g., at Block 202) and/or may be otherwise managed by the UE 102 (and/or incremented before transmitting in Block 220). For example, the feedback tag can be managed by the UE 102 and/or access network node 104 to facilitate determining that the UE 102 and access network node 104 are communicating feedback as expected (e.g., that the UE 102 is communicating the feedback for certain communications as expected by the access network node 104). Thus, the feedback tag may implicitly indicate the end subframe being acknowledged and/or can implicitly indicate which subframes have already been acknowledged (e.g., based on a subframe related to the subframe over which the indication is transmitted by the access network node 104 including the feedback tag).

In any case, in one example, feedback transmitting component 118 can first perform a CCA and/or ECCA to acquire channel resource for transmitting the grouped feedback to the access network node 104 (e.g., based on receiving the indication to communicated grouped feedback and grouping the feedback for communication). Once channel resources are acquired, feedback transmitting component 118 transmits the grouped feedback to access network node 104. In this regard, communication of feedback from UE 102 to access network node 104 can be independent of a time for completing CCA/ECCA.

Moreover, in a specific example, feedback transmitting component 118 can transmit the feedback (e.g., the grouped feedback and/or the feedback tag) on an uplink control channel (e.g. a physical uplink control channel (PUCCH)) using a defined format (e.g., format 3) or a new format. Moreover, in an example, feedback transmitting component 118 can apply cyclic redundancy check (CRC) protection to the grouped feedback transmitted to access network node 104. In addition, in an example, feedback transmitting component 118 can multiplex the grouped feedback on uplink shared channel resources (e.g., physical uplink shared channel (PUSCH)) if it is determined that the grouped feedback collides with the uplink shared channel. In this example, feedback transmitting component 118 may not apply CRC; however, feedback transmitting component 118 may apply separate power control, separate encoding, etc., for the grouped feedback to facilitate differentiation from the shared data by the access network node 104 receiving the feedback and shared data.

In another example, feedback transmitting component 118 can transmit grouped feedback, at Block 220, as an initial transmission over uplink resources granted by access network node 104. In this example, the indication received at Block 202 may be a grant of feedback resources, as described. The feedback transmitting component 118 transmits the grouped feedback and/or the feedback tag over the granted resources, and the access network node 104 uses the feedback tag to determine and synchronize the grouped feedback with the transmissions to the UE 102 over the plurality of subframes since the last feedback was received (e.g., in response to providing feedback resource to the UE 102), as described further herein.

FIG. 3 illustrates a method 300 for requesting and receiving grouped feedback information. Method 300 includes, at Block 302, transmitting an indication to communicate feedback for a plurality of subframes. Feedback triggering component 122 can transmit the indication (e.g., to the UE 102) to communicate feedback for the plurality of subframes. As described, in an example, the indication may include an indication of the plurality of subframes or related process identifiers for which feedback is requested. In another example, the indication may include a feedback tag or other grouping information that may be incremented, by feedback triggering component 122, for each request to communicate feedback information. Providing the feedback tag in this regard can enable UE 102 to determine the plurality of subframes between the received feedback tag and a previously received feedback tag for grouping feedback, and to ensure the feedback being reported by the UE 102 corresponds to feedback requested by the access network node 104. In addition, transmitting the indication at Block 302 may optionally include, at Block 304, transmitting the indication in a resource grant for communicating grouped feedback. Feedback triggering component 122 can transmit the indication in the resource grant (e.g., to UE 102) for communicating grouped feedback, as described.

For example, feedback triggering component 122 can assign resources to the UE 102 for communicating the feedback, which may include assigning resources similarly to PUSCH resources, indicating the resources explicitly, using indexing to assign the resources, and/or the like. Feedback triggering component 122 can assign the feedback resources in downlink grants communicated to the UE 102 (e.g., by access network node 104), for example. Moreover, feedback triggering component 122 may implicitly indicate the resource grant for transmitting feedback based on a selected MCS for the corresponding downlink grant, a number of bits to be transmitted as HARQ feedback (e.g., based on a number of process identifiers and/or a number of the plurality of subframes, etc.), and/or the like. In another example, the indication may be an explicit indication that the feedback triggering component 122 transmits to the UE 102, (e.g., which may indicate one or more process identifiers for which feedback is to be transmitted), and/or the like.

Method 300 also optionally includes, at Block 306, receiving grouped feedback for one or more process identifiers corresponding to the plurality of subframes, which may include a feedback tag indicating the plurality of subframes to which the grouped feedback relates. Feedback receiving component 124 can receive the grouped feedback for the one or more process identifiers corresponding to the plurality of subframes, which may include the feedback tag indicating the plurality of subframes to which the grouped feedback relates. For example, the grouped feedback can indicate feedback for the plurality of subframes (and/or more specifically for the one or more process identifiers) in a feedback bitmap. As described, for example, the feedback bitmap may include one or more bits that each indicate feedback for process identifiers received in the plurality of subframes (e.g., one or more bits can relate to feedback for a given process identifier), etc. In another example, the grouped feedback can indicate bundling of feedback for the plurality of process identifiers as one or more feedback values. In another example, feedback receiving component 124 may receive grouped feedback as an initial reception over uplink resources grants by UE 102.

Method 300 may optionally include, at Block 308, determining whether the expected feedback is received. Feedback receiving component 124 can determine whether the expected feedback is received (e.g., from UE 102). If not, method 300 can optionally include, at Block 310, transmitting another indication to communicate feedback for another plurality of subframes, where the indication specifies an expected feedback tag. Feedback triggering component 122 can transmit the another indication to communicate feedback for another plurality of subframes (e.g., to UE 102), where the indication specifies the expected feedback tag. For example, feedback receiving component 124 can expect to receive feedback within a duration from the time of feedback triggering component 122 triggering the feedback by the UE 102 (e.g., transmitting the indication to the UE 102). Thus, determining whether the expected feedback is received at Block 308 can include determining whether the expected feedback is received within the duration of time. If not, another indication is transmitted at Block 310, as described. This can include feedback triggering component 122 repeating the trigger (e.g., transmitting the indication with the same feedback tag) to the UE 102. Where feedback trigger receiving component 112 receives one or more additional triggers for the same feedback tag, n, as previously reported, feedback grouping component 116 can group feedback for process identifiers from the first subframe, l, corresponding to the previous feedback tag, n−1, to the subframe, m, corresponding to the one or more additional triggers with feedback tag n, where m may be greater than a previous m corresponding to a previous trigger with feedback tag n. In this regard, for example, the one or more additional triggers can cause the UE 102 to report grouped feedback for process identifiers for which feedback was not previously received and also including process identifiers for any additional subframes between the last trigger and the subframe related to the current additional trigger.

In addition, determining whether expected feedback is received at Block 308 may also include feedback receiving component 124 determining whether expected feedback is received based on comparing the feedback tag in the grouped feedback to a feedback tag expected by the feedback receiving component 124 (e.g., the feedback tag specified in the indication by the feedback triggering component 122 at Block 302 or otherwise an incremented value of the last feedback tag received from UE 102). If the feedback tags do not match, for example, feedback receiving component 124 can determine an error scenario, and can transmit another indication at Block 310. In one example, in response to the error scenario, feedback triggering component 122 can trigger a new request for feedback to the UE 102 with the expected feedback tag in an attempt to receive feedback corresponding to the expected feedback tag. Similarly, where feedback trigger receiving component 112 receives a trigger for feedback with an unexpected feedback tag (e.g., a feedback tag other than an increment of a previous feedback tag), as described, feedback trigger receiving component 112 can determine an error scenario. In one example, feedback grouping component 116 may generate a NACK (or grouped NACK) for responding to the feedback trigger.

Method 300 can also include, at Block 312, processing the grouped feedback to determine whether to retransmit data related to one or more process identifiers. Feedback receiving component 124 can process the feedback to determine whether to retransmit data related to one or more process identifiers (e.g., to UE 102 via communicating component 120). For example, where the UE 102 indicates NACK in one or more bits of the feedback (e.g., in one or more bits of a feedback bitmap), feedback receiving component 124 can determine to which process identifier the NACK relates, and communicating component 120 can accordingly retransmit one or more transport blocks related to the process identifier in one or more subsequent subframes. Communicating component 120 may schedule retransmission of data similarly to scheduling the initial transmission of the data, and thus the retransmission may also include feedback information, such as the indication previously described with reference to Blocks 302 and 304.

Moreover, processing the grouped feedback at Block 312 can include performing a CRC based on the CRC received as part of the grouped feedback communication to ensure successful receipt of the feedback. In other examples, where the grouped feedback is received at Block 306 over shared data resources (e.g., PUSCH), processing the grouped feedback at Block 312 may additionally or alternatively include determining a power control, encoding, etc. of the grouped feedback to differentiate the grouped feedback from other shared data channel transmissions from the UE 102.

Figure 4:
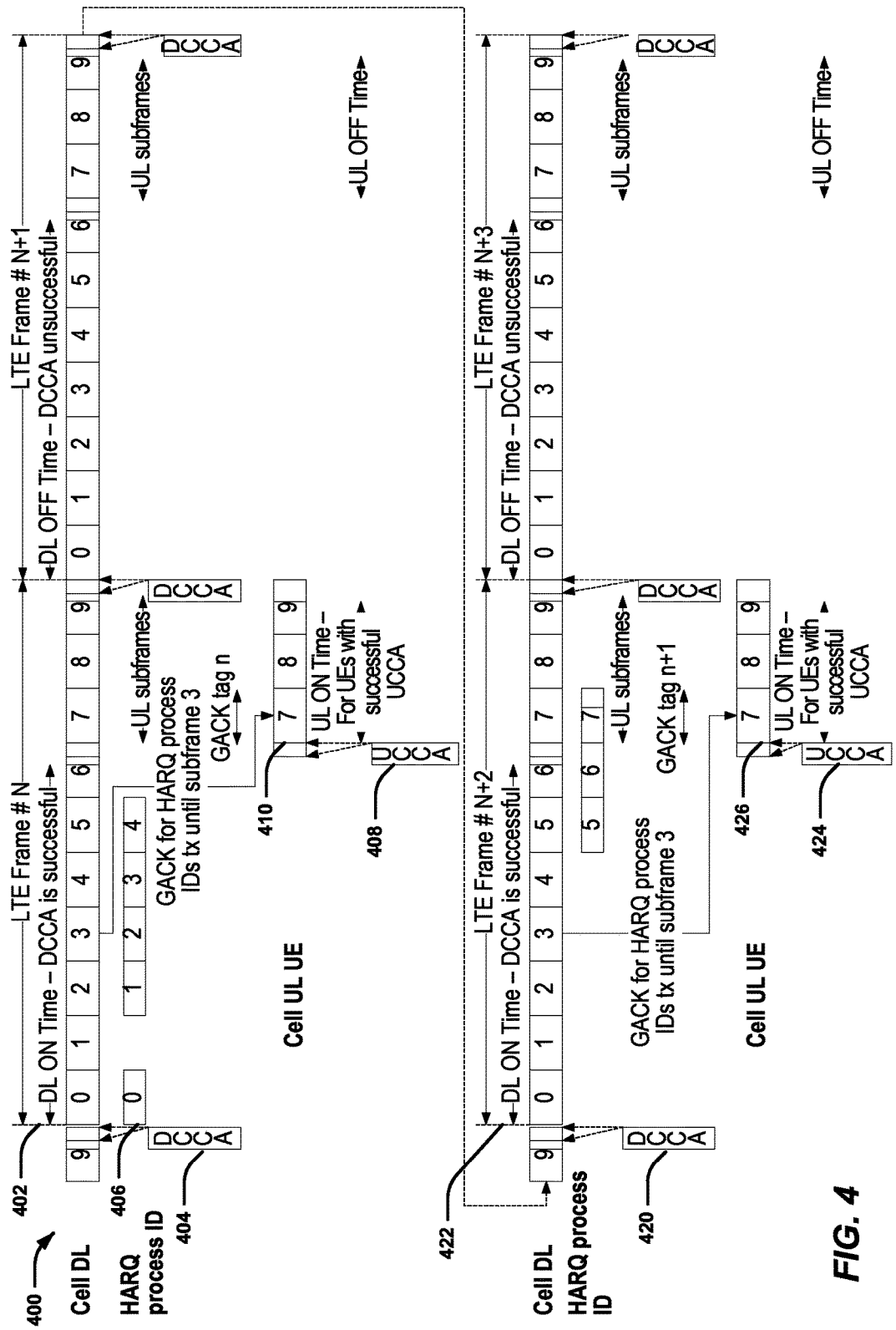
FIG. 4 illustrates an example set of communication frames in accordance with aspects described herein.

FIG. 4 illustrates an example set of frames 400 of communications between a UE (e.g., UE 102) and access network node (e.g., access network node 104), as described herein. Frames 400 include LTE Frame #N 402, which has 10 subframes numbered 0 through 9, where the subframes correspond to cell downlink (DL) resources, which may include downlink communications from a primary cell (PCell) or secondary cell (SCell) where the UE is configured to communicate with multiple cells (e.g., using carrier aggregation), in one example. The access network node 104 performs a downlink CCA (DCCA) 404, and acquires or gains access to the channel in time for transmitting at subframe 0 of LTE Frame #N 402. Access network node 104 can transmit communications during the downlink on time for subframes 0 through part of subframe 6, after which the access network node 104 no longer has clear access to the channel. During these subframes, communicating component 120 of access network node 104 can transmit downlink communications, and feedback triggering component 122 can indicate HARQ process identifiers 0 through 4 406 such to indicate that the UE 102 should report feedback for corresponding transport blocks related to the HARQ process identifiers. Feedback trigger receiving component 112 can receive the indication of the HARQ process identifiers 0 through 4 along with associated downlink communications from access network node 104.

In this example, UE 102 can perform an uplink CCA (UCCA) 408, and can acquire the channel for transmitting uplink communications to the access network node 104 at subframe 7 410, where subframes 7 through 9 correspond to cell uplink (UL) resources for a UE. In this regard, UE 102 can transmit feedback for the HARQ process identifiers that occurred in subframes up to subframe 3 (e.g., at least 4 subframes before subframe 7). Thus, for example, process ID determining component 114 can determine to report feedback for HARQ process identifiers 0, 1, and 2, as these HARQ process identifiers correspond to subframes from the subframe over which initial communications are received (e.g., subframe 0) to the subframe that is at least 4 subframes before the current subframe (e.g., subframe 3). Feedback grouping component 116 can accordingly group feedback related to these HARQ process identifiers, and feedback transmitting component 118 can transmit the grouped feedback to access network node 104, as described. For example, feedback transmitting component 118 can transmit the feedback as an initial communication in subframe 7 410 based on performing the successful UCCA 408. In another example, where the downlink communications received from the access network node 104 in subframes 0 through 6 indicate resources for communicating feedback, feedback transmitting component 118 may additionally or alternatively transmit the feedback over indicated resources. In addition, in an example, feedback transmitting component 118 may transmit the feedback according to resources that may be implicitly indicated in communications during subframes 0 through 6 from the access network node 104 (e.g., based on an MCS of the communications, the number of process identifiers for which to report feedback, etc.).

In addition, feedback transmitting component 118 can indicate a feedback tag (also referred to as a group ACK (GACK) tag), n, in the feedback transmitted to the access network node 104 in subframe 7 410. As described, feedback receiving component 124 can manage a feedback tag as well, and can utilize the feedback tag generated by the UE 102 and included in the grouped feedback to ensure the grouped feedback is for an expected set of subframes or related HARQ process identifiers. If not, feedback triggering component 122 can indicate the expected feedback tag in a subsequent indication of resources sent to the UE 102 for communicating feedback to the access network node 104.

In this example, another successful DCCA 420 is performed in LTE Frame #N+2 422. Thus, the access network node 104, or communicating component 120 thereof, communicates over subframes 0 through part of 6. Feedback triggering component 122 can trigger feedback for HARQ process identifiers 5, 6, and 7, and feedback trigger receiving component 112 can receive the trigger for this feedback. In this LTE frame 422, the UE 102 can perform a UCCA 424 to acquire the channel for transmitting uplink communications in subframe 7 426. Thus, process ID determining component 114 can determine the process identifiers for reporting feedback based on the process identifiers for which feedback was previously reported (e.g., for feedback tag n−1, where n is the current incremented tag) to process identifiers corresponding to a current subframe. In this example, process ID determining component 114 can determine to report feedback for process identifiers 3 and 4, which occurred after previous subframe 3 in LTE frame 402 (and thus were not included in the last feedback transmission for feedback tag n−1. With no other process identifiers received relating to subframe 3 in LTE frame 422 and before, feedback grouping component 116 can group the feedback for these HARQ process identifiers 3 and 4, and feedback transmitting component 118 can transmit the grouped feedback to access network node 104. Process ID determining component 114 can determine HARQ process identifiers 5, 6, and 7 for transmitting in a next feedback transmission opportunity, as described. It is to be appreciated in this example that the channel is not acquired for cell DL and the cell UL in subframes N+1 and N+3. For example, the channel may not be acquired for cell DL due to an unsuccessful CCA, and/or may not be acquired for cell UL due to no corresponding DL communications in the subframe and/or due to failed CCA.

Figure 5:
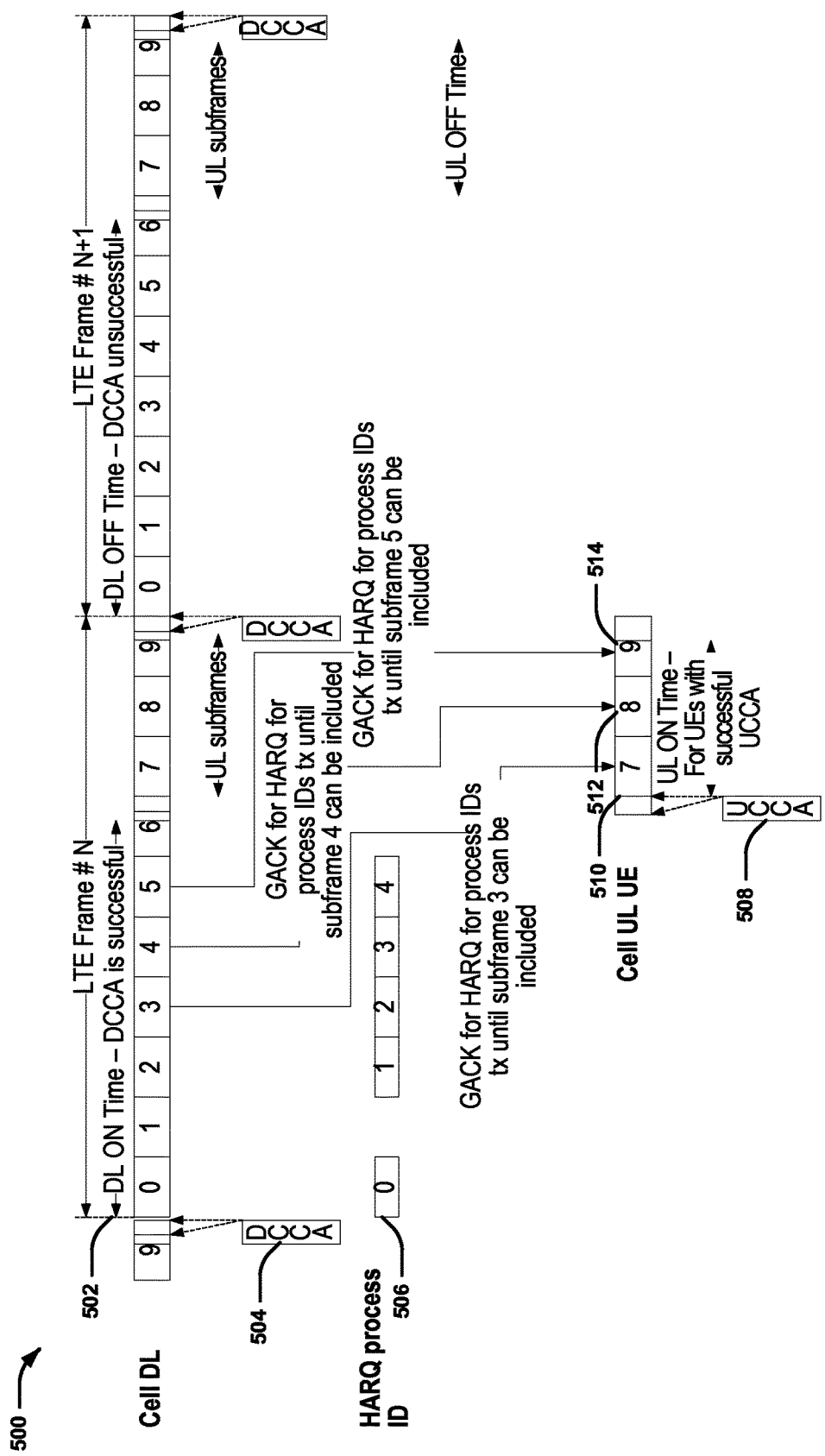
FIG. 5 illustrates an example set of communication frames in accordance with aspects described herein.

FIG. 5 illustrates an example set of frames 500 of communications between a UE and access network node, as described herein. Frames 500 include LTE Frame #N 502, which has 10 subframes numbered 0 through 9. The access network node 104 performs a downlink CCA (DCCA) 504, and acquires the channel in time for transmitting at subframe 0 of LTE Frame #N 502. Access network node 104 can transmit communications during the downlink on time for subframes 0 through part of subframe 6, after which the access network node 104 no longer has clear access to the channel. During these subframes, communicating component 120 of access network node 104 can transmit downlink communications, and feedback triggering component 122 can indicate HARQ process identifiers 0 through 4 506 such to indicate that the UE 102 should report feedback for corresponding transport blocks related to the HARQ process identifiers. Feedback trigger receiving component 112 can receive the indication of the HARQ process identifiers 0 through 4 along with associated downlink communications from access network node 104.

In this example, UE 102 can perform an uplink CCA (UCCA) 508, and can acquire the channel for transmitting uplink communications to the access network node 104 at subframe 7 510. In this regard, UE 102 can transmit feedback for the HARQ process identifiers that occurred in subframes up to subframe 3 (e.g., at least 4 subframes before subframe 7). Thus, for example, process ID determining component 114 can determine to report feedback for HARQ process identifiers 0, 1, and 2, as these HARQ process identifiers correspond to subframes from the subframe over which initial communications are received (e.g., subframe 0) to the subframe that is at least 4 subframes before the current subframe (e.g., subframe 3). Feedback grouping component 116 can accordingly group feedback related to these HARQ process identifiers, and feedback transmitting component 118 can transmit the grouped feedback to access network node 104, as described. For example, feedback transmitting component 118 can transmit the feedback as an initial communication in subframe 7 510 based on performing the successful UCCA 508. In another example, where the downlink communications received from the access network node 104 in subframes 0 through 6 indicate resources for communicating feedback, feedback transmitting component 118 may additionally or alternatively transmit the feedback over indicated resources. In addition, in an example, feedback transmitting component 118 may transmit the feedback according to resources that may be implicitly indicated in communications during subframes 0 through 6 from the access network node 104 (e.g., based on an MCS of the communications, the number of process identifiers for which to report feedback, etc.).

Additionally, in this example, the UE 102 still has the channel in subframe 8 512, and may accordingly communicate feedback for process identifiers related to transport blocks communicated between a last subframe for which feedback was previously reported and a subframe related to the current subframe (4 subframes from the current subframe, in this example). Thus, for example, process ID determining component 114 may determine to communicate feedback for process identifier 3 in subframe 8 512, and feedback transmitting component 118 can transmit the feedback for process identifier 3. Similarly, the UE 102 still has the channel acquired in subframe 9 514 based on UCCA 508. Accordingly, process ID determining component 114 may determine to communicate feedback for process identifiers related to transport blocks communicated between a last subframe for which feedback was previously reported and a subframe related to the current subframe (4 subframes from the current subframe, in this example). Thus, for example, process ID determining component 114 may determine to communicate feedback for process identifier 4 in subframe 9 514, and feedback transmitting component 118 can transmit the feedback for process identifier 4. It is to be appreciated in this example that the channel is not acquired for cell DL and the cell UL in subframe N+1. For example, the channel may not be acquired for cell DL due to an unsuccessful CCA, and/or may not be acquired for cell UL due to no corresponding DL communications in the subframe and/or due to failed CCA.

Figure 6:
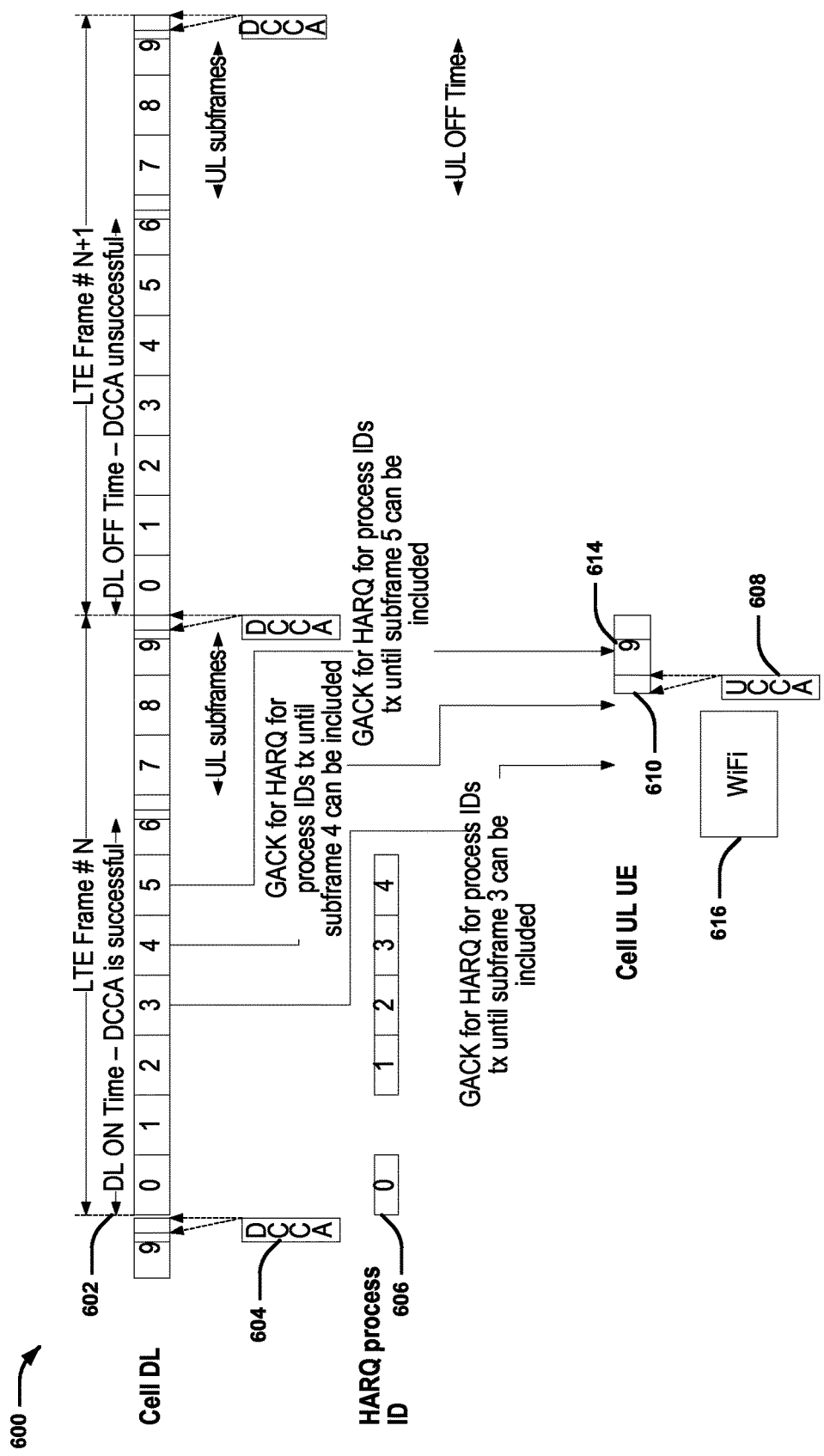
FIG. 6 illustrates an example set of communication frames in accordance with aspects described herein.

FIG. 6 illustrates an example set of frames 600 of communications between a UE and access network node, as described herein. Frames 600 include LTE Frame #N 602, which has 10 subframes numbered 0 through 9. The access network node 104 performs a downlink CCA (DCCA) 604, and acquires the channel in time for transmitting at subframe 0 of LTE Frame #N 602. Access network node 104 can transmit communications during the downlink on time for subframes 0 through part of subframe 6, after which the access network node 104 no longer has clear access to the channel. During these subframes, communicating component 120 of access network node 104 can transmit downlink communications, and feedback triggering component 122 can indicate HARQ process identifiers 0 through 4 606 such to indicate that the UE 102 should report feedback for corresponding transport blocks related to the HARQ process identifiers. Feedback trigger receiving component 112 can receive the indication of the HARQ process identifiers 0 through 4 along with associated downlink communications from access network node 104.

In this example, UE 102 can perform an uplink CCA (UCCA) 608, which may not succeed until before subframe 9 614 due to the channel being occupied by a WiFi communication 616 from the UE or one or more other UEs. In any case, UE 102 acquires the channel at 610 for transmitting uplink communications to the access network node 104 in subframe 9 614. In this regard, UE 102 can transmit feedback for the HARQ process identifiers that occurred in subframes up to subframe 5 (e.g., at least 4 subframes before subframe 9). Thus, for example, process ID determining component 114 can determine to report feedback for HARQ process identifiers 0, 1, 2, 3, and 4, as these HARQ process identifiers correspond to subframes from the subframe over which initial communications are received (e.g., subframe 0) to the subframe that is at least 4 subframes before the current subframe (e.g., subframe 5). Feedback grouping component 116 can accordingly group feedback related to these HARQ process identifiers, and feedback transmitting component 118 can transmit the grouped feedback to access network node 104, as described. For example, feedback transmitting component 118 can transmit the feedback as an initial communication in subframe 9 614 based on performing the successful UCCA 608. In another example, where the downlink communications received from the access network node 104 in subframes 0 through 6 indicate resources for communicating feedback, feedback transmitting component 118 may additionally or alternatively transmit the feedback over indicated resources. In addition, in an example, feedback transmitting component 118 may transmit the feedback according to resources that may be implicitly indicated in communications during subframes 0 through 6 from the access network node 104 (e.g., based on an MCS of the communications, the number of process identifiers for which to report feedback, etc.). It is to be appreciated in this example that the channel is not acquired for cell DL and the cell UL in subframe N+1. For example, the channel may not be acquired for cell DL due to an unsuccessful CCA, and/or may not be acquired for cell UL due to no corresponding DL communications in the subframe and/or due to failed CCA.

Figure 7:
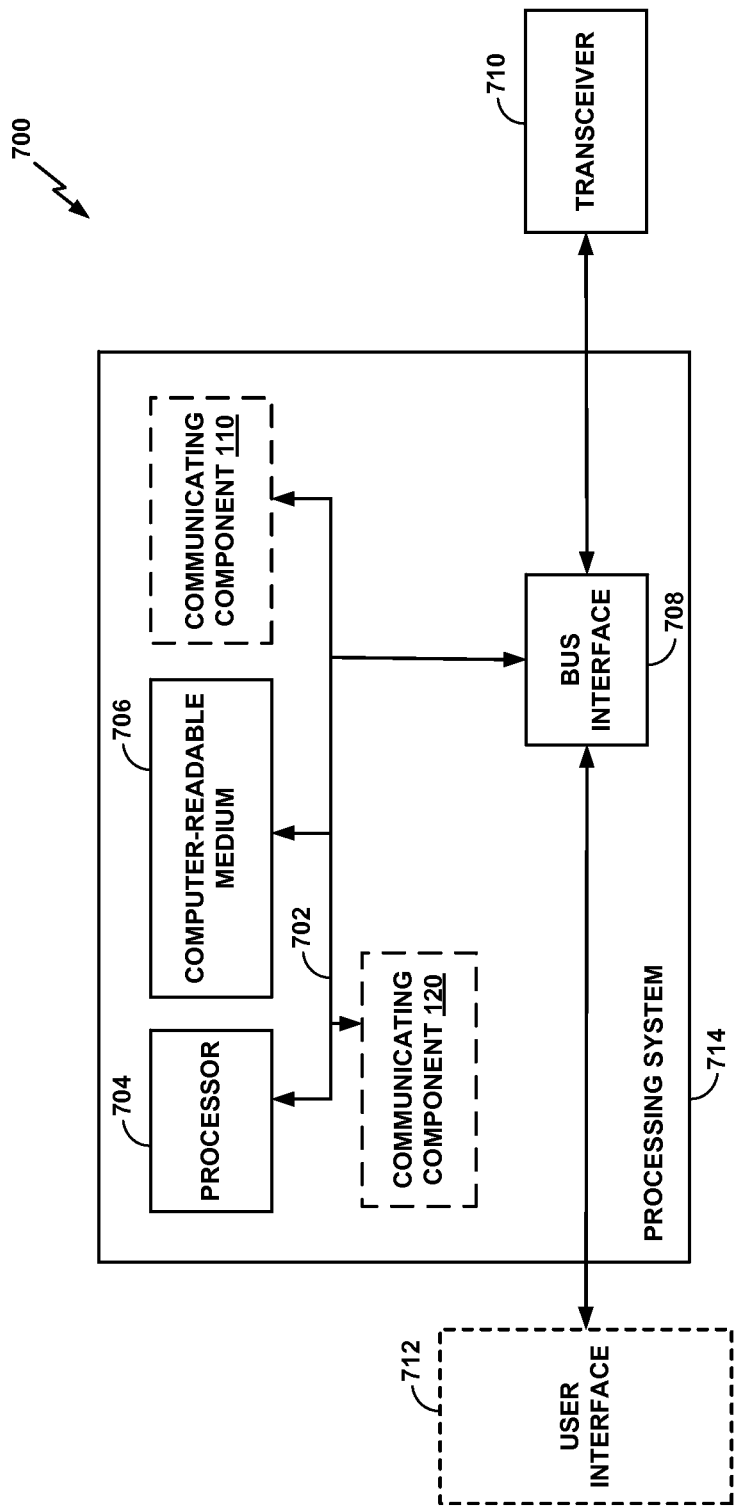
FIG. 7 is a diagram illustrating an example of a hardware implementation for an apparatus employing a processing system.

FIG. 7 is a conceptual diagram illustrating an example of a hardware implementation for an apparatus 700 employing a processing system 714. In some examples, the processing system 714 may comprise a UE (e.g., UE 102 of FIG. 1), an access network node (e.g., access network node 104 of FIG. 1), etc. In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors, represented generally by the processor 704, computer-readable media, represented generally by the computer-readable medium 706, communicating component 110, or one or more components thereof, (see FIG. 1), communicating component 120, or one or more components thereof, (see FIG. 1), etc., which may be configured to carry out one or more methods or procedures described herein (e.g., method 200 in FIG. 2, method 300 in FIG. 3, etc.), and/or communicate based on the example sets of frames 400 in FIG. 4, frames 500 in FIG. 5, frames 600 in FIG. 6, etc. In addition, as described, transceiver 710, as described herein, can be similar to, or can include or implement, communicating component 110, or one or more components or functions thereof, communicating component 120, or one or more components or functions thereof, etc. In some instances, at least some of the operations of communicating component 110, one or more components thereof, communicating component 120, one or more components thereof, or of other components described above and/or in FIG. 1, and/or functions thereof, may be implemented or performed by the processor 704 using information and/or instructions stored in the computer-readable medium 706.

The bus 702 may also link various other circuits such as timing sources, peripherals, voltage regulators, and power management circuits, which are well known in the art. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, touchscreen display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described infra for any particular apparatus, component, etc., described herein. The computer-readable medium 706 may also be used for storing data that is manipulated by the processor 704 when executing software.

In an aspect, processor 704, computer-readable medium 706, transceiver 710, or a combination thereof, may be configured or otherwise specially programmed to perform the functionality of the communicating component 110, communicating component 120, components thereof, etc. (see FIG. 1), or various other components described herein. For example, processor 704, computer-readable medium 706, transceiver 710, or a combination thereof, may be configured or otherwise specially programmed to perform the functionality of the communicating component 110, communicating component 120, components thereof, etc. as described in reference to one or more methods described herein (e.g., the method 200 in FIG. 2, the method 300 in FIG. 3, etc.), and/or the like. For example, processor 704 can have logic for performing functions described above with respect to communicating component 110, one or more components thereof, communicating component 120, one or more components thereof, etc.

Figure 8:
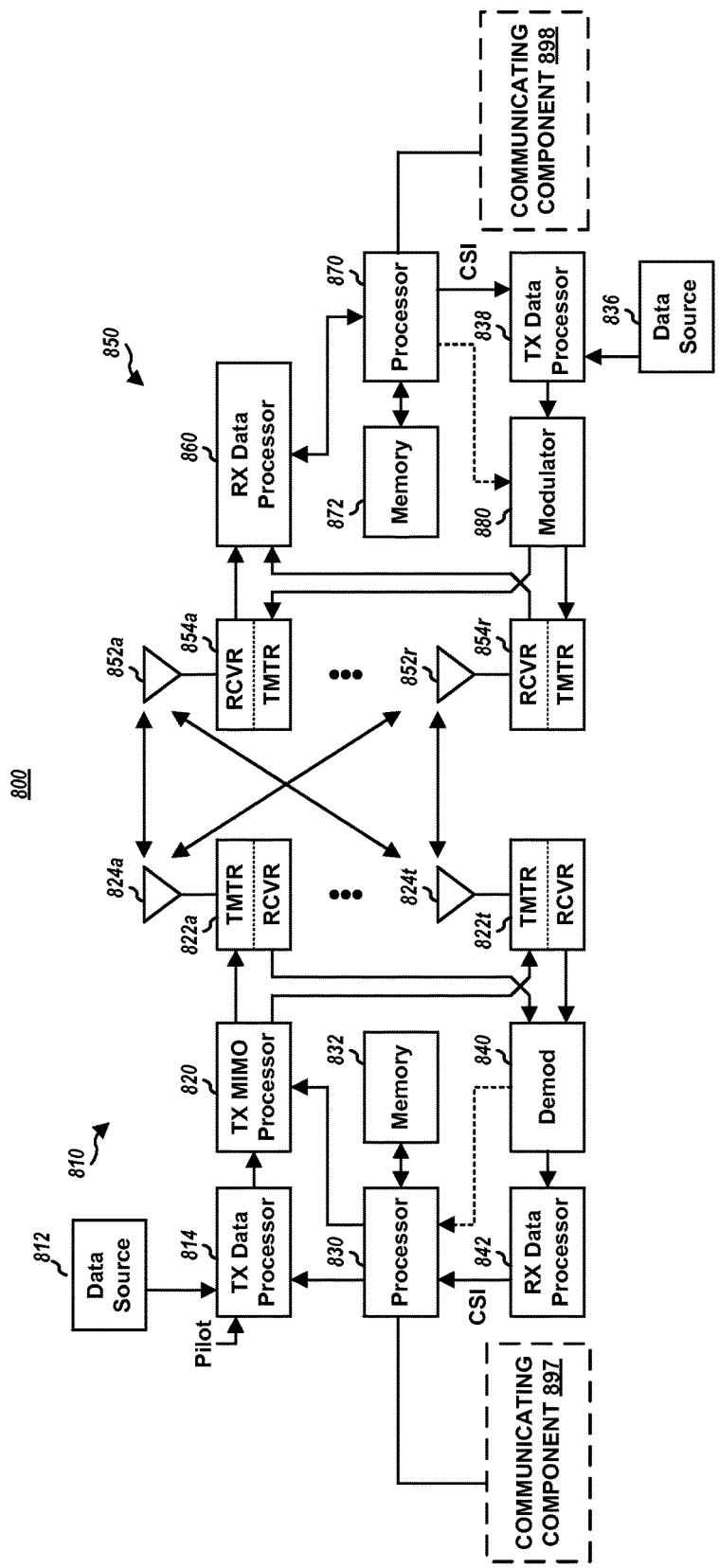
FIG. 8 is a diagram illustrating an example of a transmitter system and a receiver system in an access network.

FIG. 8 is a block diagram of an embodiment of a transmitter system 810 (e.g., a UE, access network node, etc.) and a receiver system 850 (e.g., an access network node, UE, etc.) in a MIMO system 800. In an example, transmitter system 810 may include one or more components of a UE or access network node, such as a communicating component 897, which may be a communicating component 110 and/or 120, and thus may include one or more components thereof for performing one or more functions described thereof (e.g., one or more Blocks of method 200 or 300, related functions described herein, etc.). Communicating component 897 is shown as coupled to processor 830, and thus processor 830 may include or may implement communicating component 897, one or more components thereof, or functionality thereof. For example, processor 830 may include logic for performing functions described above with respect to a communicating component 897 and/or one or more components thereof. It is to be appreciated that additional processors (e.g., TX data processor 814, RX data processor 842, etc.) and/or other components of the transmitter system 810 (e.g., transmitter/receiver 822a-822t, etc.) can include or implement communicating component 897, one or more components thereof, or functionality thereof.

Moreover, in an example, receiver system 850 may be and/or may include a UE or access network node, as described herein, and thus may include one or more components thereof, such as a communicating component 898, which may be a communicating component 110 and/or 120, and thus may include one or more components thereof for performing one or more functions described thereof (e.g., one or more Blocks of method 200 or 300, related functions described herein, etc.). Communicating component 898 is shown as coupled to processor 870, and thus processor 870 may include or may implement communicating component 898, one or more components thereof, or functionality thereof. For example, processor 870 may include logic for performing functions described above with respect to a communicating component 898 and/or one or more components thereof. It is to be appreciated that additional processors (e.g., TX data processor 838, RX data processor 860, etc.) and/or other components of the receiver system 850 (e.g., transmitter/receiver 852a-852r, etc.) can include or implement communicating component 898, one or more components thereof, or functionality thereof.

It is to be appreciated that transmitter system 810, though referred to as a transmitter system, may be capable of performing reception operations as described herein for receiver system 850. Similarly, though receiver system 850 is referred to herein as a receiver system, it may be capable of also performing transmission operations as described herein for transmitter system 810. At the transmitter system 810, traffic data for a number of data streams is provided from a data source 812 to a transmit (TX) data processor 814. In addition, it is to be appreciated that transmitter system 810 and/or receiver system 850 can employ the systems (FIGS. 1 and 7), methods (FIGS. 2 and 3), frame structures (FIGS. 4-6), etc. described herein to facilitate wireless communication between the transmitter system 810 and receiver system 850. For example, components or functions of the systems and/or methods described herein (e.g., communicating component 897, one or more components thereof, communicating component 898, one or more components thereof, method 200, method 300, etc.) can be part of a memory 832 and/or 872 or processors 830 and/or 870 described below, and/or can be executed by processors 830 and/or 870 to perform the disclosed functions.

In an embodiment, each data stream is transmitted over a respective transmit antenna.

TX data processor 814 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 830.

The modulation symbols for all data streams are then provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In certain embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

For example, where the transmitter system 810 is an access network node the transmitted signals may relate to indications for providing feedback to the transmitter system 810, as described above. In addition, for example, where the transmitter system 810 is a UE, the transmitted signals may relate to feedback provided to the receiver system 850.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use. Processor 870 formulates a reverse link message comprising a matrix index portion and a rank value portion.

The reverse link message can comprise various types of information regarding the communication link and/or the received data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Processor 830 then determines which pre-coding matrix to use for determining the beamforming weights then processes the extracted message.

Processors 830 and 870 can direct (e.g., control, coordinate, manage, etc.) operation at transmitter system 810 and receiver system 850, respectively. Respective processors 830 and 870 can be associated with memory 832 and 872 that store program codes and data. For example, processors 830 and 870 can perform functions described herein with respect to UE 102, access network node 104, etc., and/or can operate one or more of the corresponding components, as described. Similarly, memory 832 and 872 can store instructions for executing the functionality or components, and/or related data.

In accordance with various aspects described herein, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A method of communicating feedback in a wireless network, comprising:
   receiving, from an access network node, an indication to communicate feedback for a plurality of subframes to the access network node;
   determining the plurality of subframes at least in part by determining a first subframe related to receiving the indication, and determining, based on a previous indication received from the access network node to communicate previous feedback for a previous plurality of subframes, at least one second subframe;
   determining a plurality of process identifiers related to transport blocks received in the plurality of subframes;
   grouping feedback for the plurality of process identifiers received in the plurality of subframes; and
   transmitting a grouped feedback resulting from the grouping and a feedback tag indicative of the plurality of subframes to the access network node.

2. The method of claim 1, wherein determining the first subframe comprises determining the first subframe as a subframe indicated in the indication.

3. The method of claim 1, wherein determining the first subframe comprises determining the first subframe as a subframe that occurs before another subframe during which the indication is received.

4. The method of claim 1, wherein receiving the indication comprises receiving a resource grant from the access network node.

5. The method of claim 4, further comprising determining resources for transmitting the grouped feedback based at least in part on a modulation and coding scheme (MCS) of the resource grant.

6. The method of claim 4, further comprising determining resources for transmitting the grouped feedback based at least in part on the plurality of process identifiers.

7. The method of claim 1, wherein the indication specifies the plurality of process identifiers.

8. The method of claim 1, wherein the indication specifies the feedback tag to be used in transmitting the grouped feedback.

9. The method of claim 8, further comprising transmitting a negative acknowledgement to the access network node where the feedback tag specified in the indication is different from an expected feedback tag.

10. The method of claim 1, wherein grouping the feedback comprises generating a feedback bitmap, wherein each of a plurality of bits in the feedback bitmap indicates grouped feedback for one of the plurality of process identifiers.

11. The method of claim 1, further comprising perfouning a clear channel assessment over channel resources for communicating with the access network node, wherein transmitting the grouped feedback comprises transmitting over the channel resources following the clear channel assessment.

12. An apparatus for communicating feedback in a wireless network, comprising:
    a memory; and
    at least one processor configured to:
    receive, from an access network node, an indication to communicate feedback for a plurality of subframes to the access network node;
    determine the plurality of subframes at least in part by determining a first subframe related to receiving the indication, and determining, based on a previous indication received from the access network node to communicate previous feedback for a previous plurality of subframes, at least one second subframe;
    determine a plurality of process identifiers related to transport blocks received in the plurality of subframes;
    group feedback for the plurality of process identifiers received in the plurality of subframes; and
    transmit a grouped feedback resulting from the grouping and a feedback tag indicative of the plurality of subframes to the access network node.

13. The apparatus of claim 12, wherein the at least one processor is configured to determine the first subframe as a subframe indicated in the indication.

14. The apparatus of claim 12, wherein the at least one processor is configured to determine first subframe as a subframe that occurs before another subframe during which the indication is received.

15. The apparatus of claim 12, wherein the at least one processor is configured to receive the indication in a resource grant from the access network node.

16. The apparatus of claim 15, wherein the at least one processor is further configured to determine resources for transmitting the grouped feedback based at least in part on a modulation and coding scheme (MCS) of the resource grant.

17. The apparatus of claim 15, wherein the at least one processor is further configured to determine resources for transmitting the grouped feedback based at least in part on the plurality of process identifiers.

18. The apparatus of claim 12, wherein the indication specifies the plurality of process identifiers.

19. The apparatus of claim 12, wherein the indication specifies the feedback tag to be used in transmitting the grouped feedback.

20. The apparatus of claim 19, wherein the at least one processor is further configured to transmit a negative acknowledgement to the access network node where the feedback tag specified in the indication is different from an expected feedback tag.

21. The apparatus of claim 12, wherein the at least one processor is configured to group the feedback at least in part by generating a feedback bitmap, wherein each of a plurality of bits in the feedback bitmap indicates grouped feedback for one of the plurality of process identifiers.

22. The apparatus of claim 12, wherein the at least one processor is further configured to perform a clear channel assessment over channel resources for communicating with the access network node and transmit the grouped feedback comprises transmitting over the channel resources, following the clear channel assessment.

23. An apparatus for communicating feedback in a wireless network, comprising:
means for receiving, from an access network node, an indication to communicate feedback for a plurality of subframes to the access network node;
means for determining the plurality of subframes at least in part by determining a first subframe related to receiving the indication, and determining, based on a previous indication received from the access network node to communicate previous feedback for a previous plurality of subframes, at least one second subframe;
means for determining a plurality of process identifiers related to transport blocks received in the plurality of subframes;
means for grouping feedback for the plurality of process identifiers received in the plurality of subframes; and
means for transmitting a grouped feedback resulting from the grouping and a feedback tag indicative of the plurality of subframes to the access network node.

24. The apparatus of claim 23, wherein the means for determining determines the first subframe as a subframe indicated in the indication.

25. The apparatus of claim 23, wherein the means for receiving receives the indication in a resource grant from the access network node.

26. The apparatus of claim 23, wherein the indication specifies the plurality of process identifiers.

27. A non-transitory computer-readable medium comprising computer-executable code for communicating feedback in a wireless network, the code comprising:
code for receiving, from an access network node, an indication to communicate feedback for a plurality of subframes to the access network node;
code for determining the plurality of subframes at least in part by determining a first subframe related to receiving the indication, and determining, based on a previous indication received from the access network node to communicate previous feedback for a previous plurality of subframes, at least one second subframe;
code for determining a plurality of process identifiers related to transport blocks received in the plurality of subframes;
code for grouping feedback for the plurality of process identifiers received in the plurality of subframes; and
code for transmitting a grouped feedback resulting from the grouping and a feedback tag indicative of the plurality of subframes to the access network node.

28. The non-transitory computer-readable medium of claim 27, wherein the code for determining determines the first subframe as a subframe indicated in the indication.

29. The non-transitory computer-readable medium of claim 27, wherein the code for receiving receives the indication in a resource grant from the access network node.

30. The non-transitory computer-readable medium of claim 27, wherein the indication specifies the plurality of process identifiers.

* * * * *